Figure 1:
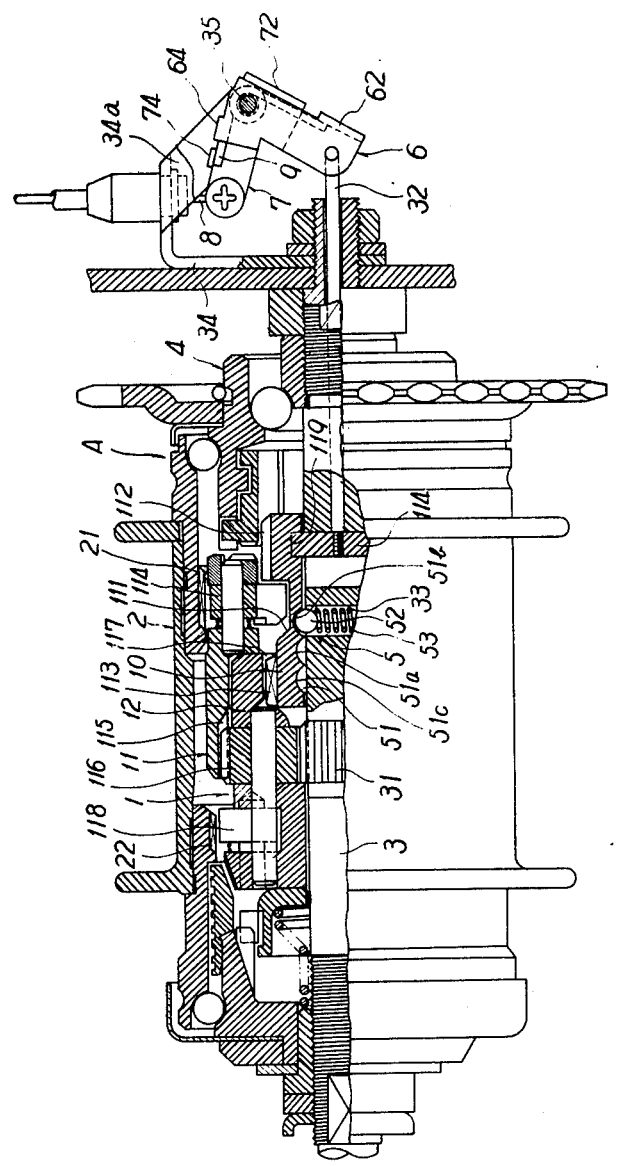

United States Patent [19]

Hanada et al.

[11] 4,179,953
[45] Dec. 25, 1979

[54] GEAR TRANSMISSION CONTROL DEVICE FOR MULTIPLE-SPEED HUB FOR BICYCLES

[75] Inventors: Mitsugu Hanada; Seiji Fukui, both of Sakai, Japan

[73] Assignee: Shimano Industrial Company, Limited, Osaka, Japan

[21] Appl. No.: 787,490

[22] Filed: Apr. 14, 1977

[30] Foreign Application Priority Data

Apr. 21, 1976 [JP] Japan ................................. 51/45865

[51] Int. Cl.² ............................................. F16H 3/44
[52] U.S. Cl. ................................................. 74/750 B
[58] Field of Search ................. 74/750 B, 781 B, 470; 192/6 A

[56] References Cited

U.S. PATENT DOCUMENTS

| | | | |
|---|---|---|---|
| 3,633,435 | 1/1972 | Farr | 74/470 |
| 3,990,715 | 11/1976 | Shimada | 74/750 B X |
| 4,052,914 | 10/1977 | Nakajima | 74/750 B |

Primary Examiner—C. J. Husar
Assistant Examiner—Frank McKenzie
Attorney, Agent, or Firm—Stevens, Davis, Miller & Mosher

[57] ABSTRACT

A gear transmission control device for a multiple-speed hub for a bicycle, in which an actuating arm is mounted to one end of a controller for the gear transmission of the hub, which arm is pivoted to a fixed member of the hub through a pivot and a control arm is pivoted to the pivot in the relation of being shiftable with respect to the actuating arm. An energy-storage spring is provided between both the arms, so that the control arm is shifted with respect to the actuating arm to energize the spring when the controller is subjected to a resistance in excess of a prescribed value. When the resistance is released the stored energy in the spring allows the actuating arm to swing, thereby changing the bicycle speed to a desirable speed-change stage.

4 Claims, 8 Drawing Figures

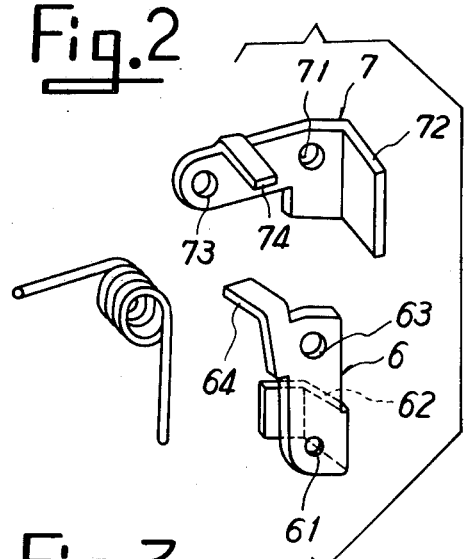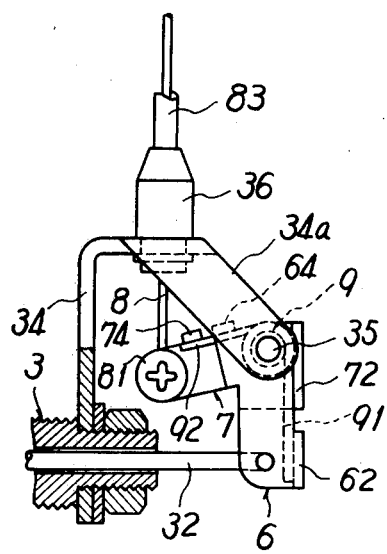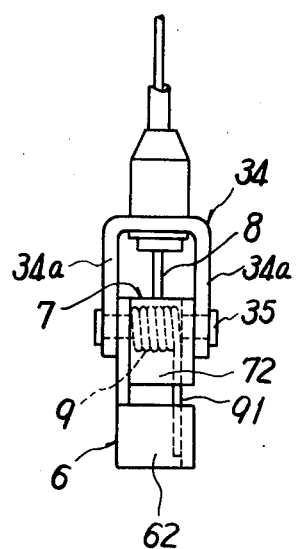

GEAR TRANSMISSION CONTROL DEVICE FOR MULTIPLE-SPEED HUB FOR BICYCLES

This invention relates to a gear transmission control device for a multiple-speed hub for a bicycle.

Conventionally, this kind of speed-change hub is controlled in such a manner that a bell crank is attached to one end of a controller, such as a rod, for controlling the gear transmission of the hub, and a control wire connects across the bell crank and the control lever fixed to a bicycle handle bar, so that the lever is controlled to pull the control wire to transmit therethrough the lever action to the gear transmission.

In the conventional control, however, the gear transmission is subjected to a resistance in excess of a prescribed value against the transmission control when the rotation of the bicycle wheel connected to the hub shell through wheel spokes is stopped or when no driving force from a driving member driven by pedalling is transmitted. Hence, there has been the problem in that the control is impossible or too heavy, that is, the resistance in excess of a prescribed value is generated to hinder the control when the rotation of the wheel is stopped.

The invention has been designed in view of the above problem. It is therefore an object of the invention to provide a gear transmission control device for a multiple-speed hub, which device is reliable to exert the speed change even when a resistance in excess of a prescribed value is applied to the controller against its movement for controlling the gear transmission.

In other words, the gear transmission control device of the invention is so constituted that at one end of the controller for the gear transmission there is attached an arm for actuating the controller. The arm is pivoted to a fixed member, such as the bicycle frame. A control arm is pivotally supported to a pivot at the actuating arm in the relation of being shiftable independently therefrom. One end of the control wire is attached to the control arm and an energy-storing spring is inserted between the actuating and the control arms. Thus, when the controller is subjected to a resistance in excess of a predetermined value against its control by the control wire, the control arm only is shifted with respect to the actuating arm so as to deflect the spring to be energized, while, when the resistance is released the stored energy allows the actuating arm to swing and the controller to act, thereby changing the bicycle speed to a desirable speed-change stage.

Thus, the invention makes it possible to control the speed-change stage when the bicycle comes to a standstill or while the bicycle is running without being pedalled thereby permitting the changing of the speed to the predetermined speed change stage.

Figure 5:
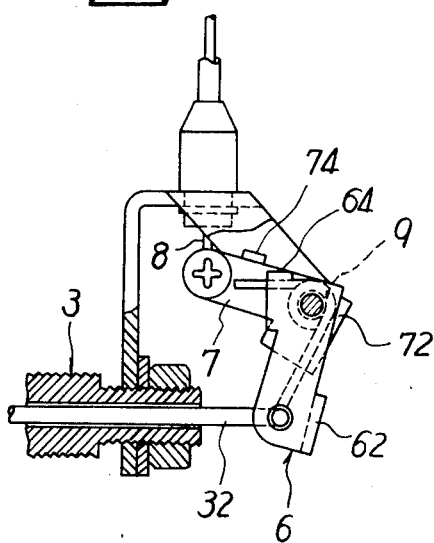
Figure 6:
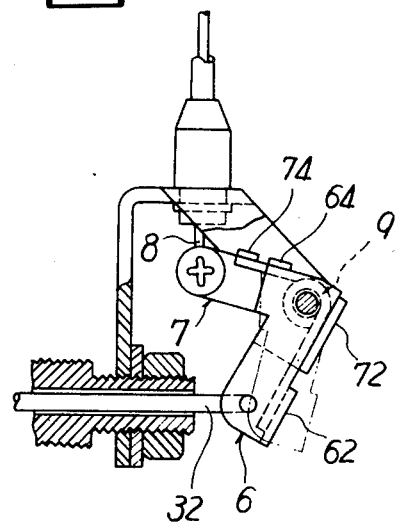
Figure 7:
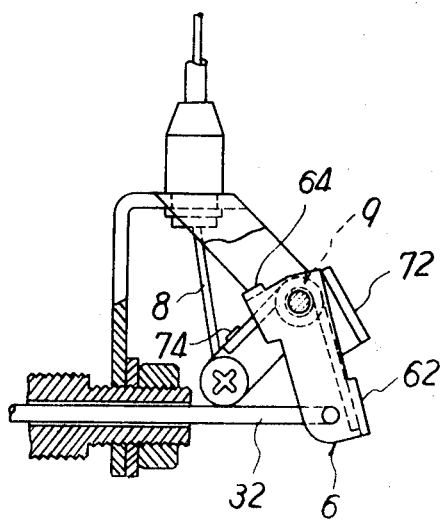
Figure 8:
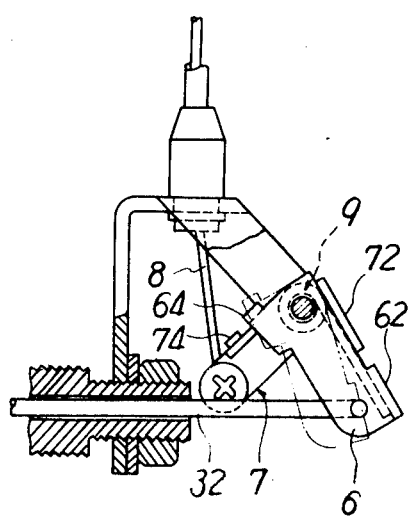

These and other objects and advantages of the invention will become more apparent from the following description taken in connection with the accompanying drawings in which:

FIG. 1 is a partially longitudinal sectional front view showing the gear transmission control device of the invention, which is incorporated into the conventional speed-change hub, FIG. 2 is a perspective exploded view of the main parts of the gear transmission control device of the invention, FIG. 3 is a front view showing the device at the middle speed stage, FIG. 4 is a side view thereof, FIG. 5 is a diagrammatic view showing the device controlled in the high speed stage when the controller is subjected to a resistance exceeding a prescribed value against its move, FIG. 6 is a diagrammatic view showing the condition where the resistance is released, FIG. 7 is a diagrammatic view of the deivce in the low speed stage when the resistance exceeding the prescribed value is released, and FIG. 8 is a diagrammatic view of the device in the condition where the resistance is released.

The embodiment shown in FIG. 1 is the gear transmission control device of the invention, incorporated into a three-stage transmission hub, where the hub is a previously proposed three stage transmission hub having a positioning and maintaining mechanism provided between a control clutch and a fixed shaft.

The three-stage transmission hub A comprises a hub shell 2, a gear transmission 1 housed in the hub shell 2, a fixed shaft 3 passing through the center of the hub shell 2, a driving member 4 having a sprocket in mesh with a driving chain (not shown), and a control clutch 10 relaying the driving force from the driving member 4 to the gear transmission 1.

The control clutch 10 is formed in a cone shape, and has at the intermediate portion an annular groove 111, and at axially both sides engageable teeth 112, 113. A groove 119 of the clutch 10 is engaged with a speed-change key 114 through which a controller 32 of a control means to be hereinafter described so that the clutch 10 is moved by operating the controller along the fixed shaft 3. A positioning and maintaining mechanism is provided between the clutch 10 and the fixed shaft 3.

The positioning and maintaining mechanism comprises a plurality of engaging grooves 51 and retainers 52 in engagement with any one of the grooves 51 so that the engagement may position the speed change stage and simultaneously maintain at the position the axially movable controller 32.

The transmission 1 comprises a sun gear 31 mounted at the fixed shaft 3, a gear frame 12 having planetary gears 116 in mesh with the sun gear 31, and a ring gear in mesh with the planetary gears 116. The gear frame 12 is provided at one end inner surface with inner teeth 117 in mesh with the teeth 113 of clutch 10 and at the other end outer surface with low speed transmitting pawls 118 in mesh with ratchet teeth 22 of the hub shell 2. The ring gear 11 is provided with high speed transmitting pawls in mesh with the teeth 113 of clutch 10 and ratchet teeth 21 of the hub shell 2.

The positioning and maintaining mechanism, which is not an essential point of the invention, is detailed as that the engaging grooves 51 are axially aligned correspondingly to each speed-change stage and are each connected with an arcuate face between them, which arcuate face facilitates slipping the retainers 52 into a desired groove when rested at between each groove.

The retainers 52 are formed of rolling members, such as balls or rollers biased toward the grooves by a resilient member 53, coiled spring. The retainers 52 are inserted into a radially through hole 33 in the fixed shaft 3 and supported by the spring 53 so as to engage with the desired groove 51. The engagement is held by the spring 53 biasing the retainers 52, outwardly and preventing the control member 10 from carelessly axially moving.

Alternatively, the positioning and maintaining member 5 may be provided between, for example, the gear frame 12 and fixed shaft 3, or the ring gear 11 and hub shell 2, depending upon the type of speed change hub.

The control device for controlling the clutch 10 of the speed-change hub A constituted as the aforesaid, will be detailed with reference to FIGS. 2 to 8.

In FIG. 3, the reference numeral 34 designates a fixed member of L-like shape, whose one end is fixed to the end portion of the fixed shaft 3 and the other free end extends oppositely obliquely downward from both widthwise edges to form two support arms 34a, 34a, the support arms 34a, 34a supporting between their tips an actuating arm 6 and a control arm 7 through a pivot 35 which are swingable independently of each other.

In detail, the actuating arm 6 and the control arm 7 are both formed of a single plate bent as shown in FIG. 2 respectively. The actuating arm 6 is longitudinally elongated to have at its lower portion a bore 61 through which one end of the controller 32 is pivoted and a first retaining tongue 62 extending rearward from one widthwise edge of the arm 6 and bent rectangularly opposite to the arm 6, and has at the upper portion a bore 63 through which is inserted to pivot 35 for supporting the support arms 34a, 34a of fixed member 34 and a second retaining tongue 64 extending rearward from the uppermost end of the arm 6.

The control arm 7 is laterally elongated to have at its lengthwise end a bore 71 for inserting the pivot 35 therein and a fixed retaining tongue 72 extending forward laterally from one end, and at the other end a bore 73 through which a fixture holds a terminal of a control wire to be hereinafter described, and a second retaining tongue 74 extending forward of the arm 7 from the upper end portion thereof at the bore 71 side with respect to the bore 73.

The pivot 35 is inserted into the bores 63 and 71 of the actuating arm 6 and the control arm 7 respectively and pivotally supports the support arms 34a, 34a of fixed member 34 oppositely to each other in a relation such that the control arm 7 is swingable with respect to the actuating arm 6. The free end of the controller 32 is pivoted to the control arm 7 through the bore 61, and a fixture 81 inserted into the bore 73 of control arm 7 secures one end of a control wire 8.

The control wire 8 is formed mainly of the so-called push-pull wire relatively large in diameter and less in flexibility, and is attached at its other end to a control lever (not shown) mounted to the bicycle handle bar, so as to control the swing of the control arm 7.

Other than the use of the push-pull wire as in the embodiment, a single pull wire is available, in which a return spring may be provided between the control clutch 10 and the fixed shaft 3 at the end portion of hub shell 2. Besides this, two wires may be connected to both ends around the bore 71 of control arm 7 so that the control arm 7 is controllable by the lever through the two wires.

In FIG. 3, the reference numeral 9 designates an energy-storage spring important in the invention. The spring 9 inserted between the actuating and the control arms is formed of a spring wire coiled at its intermediate portion, which coiled portion is supported by the pivot 35. One end of the spring coiled portion engages the first retaining tongue 62 of actuating arm 6 and the first retaining tongue 72 of control arm 7 while the other end 92 engages the second retaining tongue 64 of actuating arm 6 and the second rataining tongue 74 of control arm 7.

When the controller 32 is subjected to a resistance exceeding a predetermined value against its travel, the control arm 7 is shifted with respect to the actuating arm 6 so that the spring 9 is compressed to be energized and when the resistance is released to stored energy allows the actuating arm 6 to swing, thereby exerting the speed change.

Alternatively, the spring 9 may be a tension spring rather than of the compression type.

The reference numeral 36 is a support attached to the free end of fixed member 34. The support 36 carries one end of outer cable 83 covering a large part of the control wire 8.

The control device of the invention is constituted as the above-mentioned, whose condition at the middle speed stage of the hub A is shown in FIG. 3, in which the middle speed engaging groove 51a is engaged with the retainers 52 to keep the transmission at the middle speed stage.

When the bicycle speed is changed from the middle speed change stage to the high speed change stage and no resistance in excess of a predetermined value is applied to the travel of controller 32, the control wire 8 is pulled by the control lever to swing the control arm 7 upward as shown from FIGS. 3 to 6 so that the actuating arm 6 is moved toward the hub A side through the spring 9 to push the controller 32 which actuates the clutch 10, thereby changing the speed to the high speed stage. At this time, the retainers 52 are engaged with the high speed engaging groove 51b thereby maintaining the clutch 10 at the high speed stage. In other words, when the speed is changed from middle to high, the spring 9 tends to be compressed by the first retaining tongue 72 of the control arm 7, but the spring 9 force overcomes the resistance against the move of controller 32 so as to transmit the speed-change action to the second retaining tongue 64 of actuating arm 6 so that the actuating arm 6 swings together with the control arm 7 toward the speed-change hub A.

On the other hand, when no resistance in excess of a predetermined value, in the speed change from the middle stage to the low stage is applied to the travel of controller 32, the control arm 7 is, as shown from FIGS. 3 and 8, swings downwardly by a push of the control wire by the lever control so that the actuating arm 6 may swing through the spring 9 in the direction opposite to the hub A, i.e., in the direction of leaving therefrom. Thus the swing makes the controller 32 move so as to acutuate the clutch 10 for changing the speed from the middle stage to the low stage and then the retainers 52 are engaged with the low speed engaging groove 51c, thereby maintaining the clutch at the low speed stage. In detail, the spring 9, when the speed is changed from middle to low, tends to be compressed by the second retaining tongue 74 of control arm 7, the spring 9 force overcomes the resistance against the move of controller 32 so that the lever control for changing the speed is applied to the first retaining tongue 62 of actuating arm 6 to allow the actuating arm 6 to swing together with the control arm 7 in the direction opposite to the hub A.

The device of the invention functions as aforesaid when the controller is subjected to no resistance in excess of a predetermined resistance. However, when the resistance exceeding the predetermined value is applied to the controller 32 against its move, the actuating arm 6 is regulated under the resistance applied thereto so as not to swing even when the control wire 8 is pulled, resulting in the control arm 7 only being swung upwardly as shown in FIG. 5., whereby both the first retaining tongue 72 of control arm 7 and the second retaining tongue 64 of actuating arm 6 compress the spring 9 to be energized therebetween. Upon disappearance of the excessive resistance, the stored energy allows the actuating arm 6 to swing toward the hub A as shown with the solid line in FIG. 6, thereby moving the controller 32 to change the speed to the high stage.

For changing the speed from the middle stage to the low stage when a resistance exceeding the predetermined is applied to controller 32, the actuating arm 6 is similarly regulated by the resistance applied to the controller 32 function so as not to swing even when the control wire 8 is pushed. Hence, the control arm 7 only swings downwardly to compress the spring 9 by the second retaining tongue 74 thereof and the first retaining tongue 62, whereby the energy is stored in the spring 9 between both the tongues. When the excessive resistace is released, the stored energy allows the actuating arm 6 to swing in the direction opposite to the hub A, that is, away from, thereby moving the controller to the low speed stage.

As seen from the abovementioned description, the gear transmission control device of the invention is so constituted that the actuating arm is mounted at its one end to one end of the controller for controlling the gear transmission housed into the speed-change hub and pivoted at the other end to the fixed member. The control arm holds at one end a terminal of the control wire and is pivoted at the other end to the pivot of the actuating arm in the relation of being shiftable therewith. An energy-storage spring is supported between both the arms so that when resistance in excess of a predetermined value is applied to the controller against its move and the control arm is shifted with respect to the actuating arm, the spring is energized, and when the resistance is released the stored energy allows the actuating arm to swing, thereby controlling the transmission for changing the bicycle speed. Accordingly, the device is assured of carrying out the speed change control even when the controller for the transmision is subjected to a resistance exceeding the prescribed value and upon release of the resistance the speed is automatically changed to a selected speed change stage. This control is carried out by shifting the control arm with respect to the actuating arm, thereby enabling a very light operation without being affected by the aforesaid resistance.

While a preferred embodiment of the invention has been described using specific terms, such description is for illustrative purposes only, and it is to be understood that changes and variations may be made without departing from the spirit or scope of the following claims.

What is claimed is:

1. A gear transmission control device for a multiple-speed hub for a bicycle, which hub houses the gear transmission within a hub shell and changes the driving force to be transmitted from a driving member to the hub shell by actuating a controller through a control wire, said device comprising:
    (a) a fixed member fixed to the bicycle frame,
    (b) an actuating arm pivotally supported to said fixed member through a pivot, said actuating arm swinging to actuate said controller, thereby changing the transmission,
    (c) a control arm pivotally supported to said fixed member through said pivot, said control arm being shiftable independently of said actuating arm, said control arm carrying at one end the control wire fixed thereto, and
    (d) an energy-storing spring insertably supported between said actuating arm and said control arm, said spring storing energy by swinging said control arm with respect to said actuating arm when said controller is, in the speed change, subjected to a resistance more than a prescribed value, said actuating arm being made swingable by the stored energy when the resistance is released, thereby moving said controller by said swinging.

2. The gear transmission control device according to claim 1, wherein said control wire is made of a single pull wire, one end of said wire being fixed to said control arm.

3. The gear transmission device according to claim 1, wherein said control wire is made of a single push-pull wire, said wire being fixed to said controlled arm.

4. The gear transmission control device according to claim 3, wherein said control arm securing one end of the control wire is provided with a first and a second retaining tongue, said actuating arm mounted with respect to said control arm in the relation of being shiftable thereto is provided with a first retaining tongue adjacent to said first retaining tongue of the control arm and with a second retaining tongue adjacent to said second retaining tongue of the control arm, and the intermediate portion of said energy-storage spring is supported on said pivot, one end of said spring being retained by said two first retaining tongues, the other end of said spring being retained to said two second retaining tongues.

* * * * *